United States Patent Office 3,503,447
Patented Mar. 31, 1970

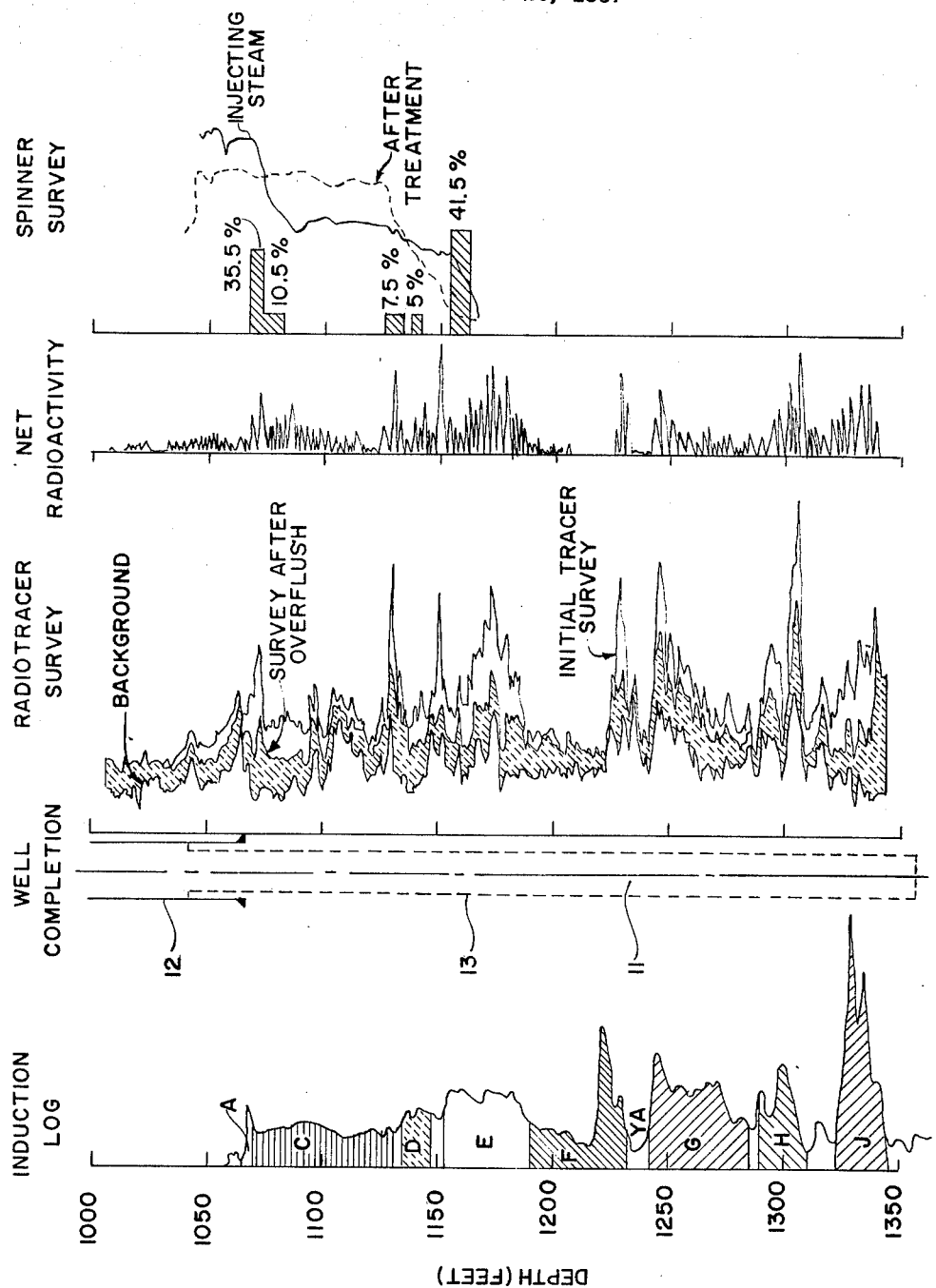

3,503,447
METHOD OF LOCATING AND PLUGGING THIEF ZONES
Tyler W. Hamby, Jr., Metairie, La., assignor to Shell Oil Company, New York, N.Y., a corporation of Delaware
Filed Dec. 26, 1967, Ser. No. 693,404
Int. Cl. E21b 33/138, 47/10
U.S. Cl. 166—254   4 Claims

ABSTRACT OF THE DISCLOSURE

The permeability of a thief zone of a well is treated and the injectivity along an interval into which the well is opened is normalized by measuring the depth within the well of at least one zone in which the injectivity into the surrounding earth formation is relatively high. The suspension of macroscopic radioactive solid particles through the well and into the surrounding earth formations is measured. The permeability of a zone of relatively high permeability is reduced by (a) injecting a liquid solution, capable of penetrating into and forming plugging material within the pores of a porous earth formation, into any portion of the zone where the radioactivity is relatively high and (b) injecting a liquid suspension of particles, capable of bridging across and sealing off fractures and vugs, into any portion of the zone where the radioactivity is substantially nominal.

BACKGROUND OF THE INVENTION

Field of the invention

The invention relates to a process of curing loss of circulation of a fluid used in drilling a hole in an underground formation. More particularly, it relates to a process for treating a well so as to reduce the permeability of a loss circulation zone and normalize the injectivity along an underground interval into which the well is opened.

Description of the prior art

During the drilling of holes in an underground formation, very permeable, cavernous or fractured rocks may be passed by the hole, and the interior of the hole may come into communication with large-volume spaces such as a cavity system or systems within the rock, with the result that the drilling fluid, which is circulated through the hole, is drained from the hole into these spaces. If the loss of drilling fluid into these spaces is not made up by a supply of new drilling fluid to the top of the hole, the fluid level in the hole will descend and may give rise to serious difficulties or may lead to abandonment of the hole.

Most wells are completed into the surrounding earth formations by opening them through perforated casings, screens, liners or the like. It has heretofore been difficult, if not impossible, to determine whether a "thief zone," i.e., a zone of anomalously high permeability, within the interval into which the well is opened is a permeable earth formation of relatively high matrix permeability or a cavernous zone in which a relatively high permeability is created by fractures and/or vugular openings. The earth formation treatments capable of reducing the permeability of a permeable earth formation having a high rock matrix permeability are different from those needed to reduce the permeability of a cavernous zone.

The treatment of an earth formation having a porous matrix requires the injection of a substantially solids-free liquid which will penetrate into the pores and be converted in situ into a solid or gel that reduces the effective permeability of the formation, e.g., the injection of a liquid mixture of resin-forming materials. The treatment of a cavernous zone requires the injection of a liquid suspension of solid particles that bridge across and form low permeability filter cakes over openings having substantially large effective diameters. Such bridging solids are preferably suspended in a liquid which is capable of solidifying or causing the solid particles to become cemented together to form a substantially impermeable mass, e.g., such as a conventional cement formulation. However, liquid plugging agents are not suitable for use in fractured or cavernous formations since they pool on the cavity floor or flow too deeply into the formation. Conversely, plugging agents containing solids such as cement can be used to close fractures and cavities but cannot be injected into a less porous formation.

The zones in which the injectivity into the surrounding earth formations is relatively high can readily be determined by conventional flowmeter or spinner survey logging techniques. Such logging techniques are commonly used in injection wells to determine the depths at which the bulk of the injected fluids are leaving the boreholes. This is evidenced by reference to U.S. Patents No. 2,593,283 and No. 2,379,138.

As discussed previously, the loss of fluid from a hole being drilled can often be combated by adding plugging material to the fluid circulating through the hole. Such plugging material (e.g., fibers, flakes, sawdust, shredded wood) is, preferably, of a size that when the fluid passes out of the hole into a cavity system in the formation, the plugging material is filtered out in the openings existing between the hole and the cavity system. The filtered-out material plugs these openings, thereby decreasing the passage therethrough to such an extent that the plastering material which is normally present in the drilling fluid seals the passage through the pores left between the plugging material.

Another way to obstruct the passage between the hole and a cavity system in the formation being drilled is by injecting a substance, such as cement, which substance sets into a solid mass. When the holes are in communication with cavity systems via large-sized openings, a liquid containing particles having a specific gravity greater than that of the liquid and having specific dimensions so as to allow the particles to deposit in the cavities can be injected through the borehole and into the cavities in the manner suggested in application Ser. No. 406,259, filed Oct. 26, 1964, now Patent No. 3,347,316. Another method of plugging large cavities by injection of a viscous liquid containing suspended particles and a viscosity breaking liquid is disclosed in application Ser. No. 649,533, filed June 28, 1967, now Patent No. 3,415,318.

Less permeable zones passed by the hole are treated in a suitable manner so as to render them more permeable such as by acid treatment or the like. If the above steps are not carried out, the displacing fluid, be it steam, gas or water, channels quickly through the thief zone or depleted permeable zones giving poor displacement in the remainder of the oil formation.

SUMMARY OF THE INVENTION

It is an object of this invention to normalize the injectivity along the interval into which a well is completed wherein the interval includes zones of both permeable matrices and cavernous formations.

The teachings of this invention are carried out by measuring the depth within a well penetrating an earth formation of at least one zone wherein the rate of injectivity into the surrounding earth formation is relatively high. The radioactivity with depth produced by injecting fluid containing a suspension of macroscopic radioactive solid particles through the well and into the surrounding earth formations is measured. Finally, the permeability of a zone of relatively high permeability is reduced by (a) injecting a liquid solution, capable of penetrating into and forming plugging material within the pores of a porous earth formation, into any portions of the zone where the radioactivity is relatively high and (b) injecting a liquid suspension of particles, capable of bridging across and sealing off fractures and vugs, into any portions of the zone where the radioactivity is substantially nominal.

BRIEF DESCRIPTION OF THE DRAWING

The figure is a partly diagrammatic and partly graphical view of a preferred embodiment of the invention.

DESCRIPTION OF THE PREFERRED EMBODIMENT

Referring to the drawing, a well bore 11 is shown which is to be understood as traversing an interval of from 1,000 to 1,350 feet in depth of an underground formation (designated "Well Completion" on the drawing). Well bore 11 has an upper cased portion 12 and lower slotted liner portion 13 as is well known in the art. Prior to casing well bore 11, an induction log may be taken by means well known in the art. The results of so logging well bore 11 is designated as "Induction Log" in the drawing. The letters and shaded areas refer to various types of sand formations encountered along the borehole wall as will be discussed further hereinbelow.

Before plugging the formations in the manner suggested by the foregoing discussions concerning the plugging of permeable formations, the maximum flow rate of the well bore 11 is observed and the point or points in the well bore 11 where the flow rate drops off is determined. In the illustrative examples of the drawing, the maximum flow rate was observed down to a depth of about 1,075 feet where the flow rate dropped to about one-half.

A conventional flow velocity spinner survey, such as disclosed in U.S. Patents 2,593,285 and 2,379,138 was used to observe this rate loss in well bore 11. Such sudden reductions in flow rate indicate a point or points of fluid entry into the surrounding earth formations. In the illustration, approximately 46 percent of the total inflow occurred at about 1,075 feet, while the remainder of the inflow occurred at about 1,150 feet. Thus, 100% in flow occurred between 1,125 and 1,160 feet as designated by the graphical solid-line portion of the drawing marked "Spinner Survey." Accordingly, this survey measures the depth within the well bore 11 of the zone or zones in which the injectivity of a fluid (as, for example, steam) into the surrounding earth formation is relatively high. The fluid is injected by conventional means well known in the art, as by pumping the fluid down the well, and the results are indicated by the solid line. The hatched areas under the "Spinner Survey" portion of FIGURE 1 designate percentages of inflow in corresponding areas of well bore 11. The dotted line refers to the results of a second spinner survey taking after plugging treatment of the formation in accordance with the teachings of the invention, as will be discussed further hereinbelow.

The radioactivity with depth is then measured by injecting a fluid containing a suspension of macroscopic radioactive solid particles through the well bore 11 and into the surrounding earth formations. For this step, a solid carrier (i.e., ion exchange resin) radioactive tracer survey is used since the radioactive resin particles will not enter a porous formation, but will plate on the formation in proportion to the amount of fluid entering. The radioactive tracer survey is extremely sensitive as evidenced by the small amount of radioactive particles it uses. For example, for the radioactive tracer survey (denoted "Radiotracer Survey") illustrated in the drawing, only 100 grams of Dowex 1X8 anion exchange resin (20–50 mesh) carrying one-half millicurie of iodine 131 was used in one barrel of sugar solution. The sugar is added to make the specific gravity of the water equal to that of the resin particles so that the particles will remain suspended throughout the solution. A conventional radiation detector is utilized in this procedure adapted to measure the gamma radiation from the iodine 131. Water is the liquid carrier for the particles. Sugar is added so that the particles will be evenly dispersed throughout the solution when the specific gravities are made equal. This assures an even concentration of particles throughout the water when it is injected into the formation.

The background radiation occurring naturally along the borehole wall is first obtained by logging this interval by conventional well-known well logging means and graphically recorded as "Background" in the drawing. The radioactivity with depth of a zone of relatively high injectivity is measured by injecting a suspension of tagged particles, also by conventional means. Such an injection procedure is known in the art; however, these techniques have been heretofore generally used only in attempts to determine the locations and/or orientations of fractures which are hydraulically induced in the walls of a borehole.

After the tagged particles are injected, a log run by means well known in the well logging art provides the graph designated "Initial Tracer Survey" in the drawing. A calcium chloride ($CaCl_2$) overflushing treatment is then preferably carried out and a second log run provides the trace designated as "Survey After Overflush" in the drawing. This overflushing step is generally not required, but is used to verify the injectivity pattern. The loss of measured radioactivity after overflushing confirms the zones of fluid entry. This step is merely for confirmation and is rarely necessary.

The final result is the "Net Radioactivity" curve which indicates the radioactivity with depth that is due solely to the injection of the suspension of tagged particles. In this radiactive tracer survey, numerous types of particles can be used with numerous types of fluids. In general, the particles are preferably macroscopic and uniformly distributed as a relatively dilute suspension in a liquid having a relatively low viscosity. Any liquid such as water, alcohol or the like in which is suspended any particle such as fine sand, clay, plastics, etc. that can be made radioactive either internally or externally may be used.

When such a suspension is injected into a borehole that is surrounded by earth formations of varying permeabilities, such as well bore 11, the liquid enters the permeable formations and leaves the particles in a filter cake along their faces. More liquid enters the more permeable formations and they accumulate most of the tagged particles. In such situations, the radioactivity with depth is highest along the intervals in which the injectivity is highest.

Where a high permeability is created by fractures and/or vugs, the liquid suspension tends to flow through such relatively large openings without depositing its tagged particles until after it has moved away from the borehole. When this happens, the radioactivity from the tagged particles is not detected in a log of the borehole, and the radioactivity with depth is insignificant along an interval in which the injectivity is high (for example, as would be shown by a conventional flowmeter or spinner survey). Thus, the absence of detectable radioactivity in a zone where the spinner survey indicates that fluid leaves well bore 11, for example, may indicate a fracture or cavity in which the fluid has moved beyond the limits of the radiation detection tool. A spinner survey indication of flow coupled with detectable radiation may indicate a porous formation. However, it should be noted that, in investigating a cased and perforated section, such as well bore 11, such an occurrence may be accompanied by the appearance of a high degree of radioactivity along an unperforated interval of the casing. This indicates that the liquid suspension traveled vertically through or along the cement casing to enter a formation having a high matrix porosity located behind the unperforated casing. Porous zones can be plugged by injecting a clear liquid type of plugging agent at the depth of the open perforation while cavernous zones can be plugged by injecting a slurry-type plugging agent.

In the well bore 11 of the drawing, the radiotracer survey and the initial or "before" spinner survey show a cavernous thief zone in well bore 11. The lower portion of well bore 11, below about 1,150 feet, is effectively isolated by filling that portion with sand and then depositing a slug of cement on the top of the sand. With the upper zone so isolated, a water suspension of silica flour, e.g., finely pulverized sand, is pumped into well bore 11 until a significant increase occurs in the pressure required to maintain a given flow rate. This indicates that the permeability of the adjacent earth formations has been substantially reduced. A slug of cement is then injected to seal the silica flour in place. After the cement hardens, the slug of cement within well bore 11 and above the sand is drilled out and the sand plug in the lower portion of well bore 11 is washed out.

Referring to the drawing, the various sand intervals of well bore 11 are shown both before and after the silica flour treatment. The A sand contains the thief zone to be plugged. Based on the results of the "before" spinner survey, 46% of the injected steam is entering the A zone; thus, the injection survey made with the radiotracer would be expected to show a peak in this region which should roughly equal about 40 to 50% of the integrated area of the net radioactivity curve, if the formation is porous.

However, the radioactivity in the A thief zone of the drawing does not correlate with the "before" spinner survey. Thus, the A formation is open enough to allow most of the resin particles to move into the A formation beyond the limits of detection. These cavernous zones in steam injection wells are believed to be due to silica solution, formation fluid removal, and possible formation subsidence.

The subsequent or "after" spinner survey (i.e., the dotted-line graph labeled "After Treatment" in the drawing) shows a maximum flow rate down to approximately 1,150 feet, thereby indicating that the A thief zone is effectively plugged.

In summary, the most important feature of this invention is that it allows one to determine the condition of the formation (porous or cavernous) immediately adjacent to the well casing. Knowing this, one can select the proper agent for plugging of the formation. For example, if the formation is porous, a slurry of particles (e.g. cement) cannot be injected without fracturing the formation, but a solids-free liquid plugging agent (e.g., gel or plastic) can be injected to achieve the desired results. On the other hand, if the formation is cavernous, a liquid plugging agent will probably flow away before it solidifies, so in this case a slurry-type (e.g., cement) plugging agent would be chosen. After correlating the results of both the spinner and radiotracer survey, the permeability of a zone of relatively high permeability can be reduced by (a) injecting a liquid solution capable of penetrating into and forming plugging material within the pores of a porous earth formation when the radioactivity is relatively high along the zone, and (b) injecting a liquid suspension of particles capable of bridging across and sealing off fractures and vugs when the radioactivity is substantially nominal along the zone.

In place of silica flour, cement or a mixture of cement and silica flour can also be injected into the formations. Also, water may be substituted for steam in the initial injection for the "before" spinner survey.

Various plugging techniques may occur to one skilled in the art after perusal of the foregoing discussion. Other changes and modifications may become apparent to one skilled in the art, and the scope of the invention is to be determined by the following claims.

I claim as my invention:

1. A method for curing loss of circulation of a fluid used in drilling a hole in an underground formation which hole communicates with a zone having at least one area of porous earth formation and one cavernous area, the method comprising the steps of:

measuring the depth within the hole of at least one zone in which the injectivity into the surrounding earth formation is relatively high;

injecting fluid containing solid radioactive material through the hole and into the surrounding earth formation and thereafter measuring the radioactivity with depth; and reducing the permeability of said zone of relatively high permeability by selectively;

(a) injecting a liquid solution, capable of penetrating into and forming plugging material within the pores of a porous earth formation, into any portion of said zone where the radioactivity measures relatively high and (b) injecting a liquid suspension of particles, that are capable of bridging across and sealing off cavernous areas, into any portion of said zone where the radioactivity measures substantially nominal.

2. The method of claim 1 wherein the step of measuring the radioactivity with depth by injecting fluid containing material includes injecting fluid containing a suspension of macroscopic radioactive particles.

3. The method of claim 1 including the step of uniformly distributing the particles as a relatively dilute suspension in the fluid prior to injecting said particles-containing-fluid into the surrounding earth formation.

4. The method of claim 1 including the step of measuring and recording the background radiation along the surrounding earth formation prior to injection of the fluid containing the radioactive material;

logging the surrounding earth formation after injection of the fluid containing the radioactive material;

overflushing the surrounding earth formation;

logging the surrounding earth formations after overflushing; and correlating the information obtained by the preceding steps so as to obtain a net radioactivity curve of the surrounding earth formation.

References Cited

UNITED STATES PATENTS

| | | | |
|---|---|---|---|
| 2,385,378 | 9/1945 | Piety | 166—4 X |
| 2,588,210 | 3/1952 | Crisman et al. | 166—4 |
| 2,869,642 | 1/1959 | McKay et al. | 166—4 |
| 2,951,535 | 9/1960 | Mihram et al. | 166—4 X |
| 3,280,912 | 10/1966 | Sheffield | 166—29 |

CHARLES E. O'CONNELL, Primary Examiner

J. A. CALVERT, Assistant Examiner

U.S. Cl. X.R.

73—155; 166—285; 250—83.6